(12) United States Patent
Lewsey (10) Patent No.: US 9,135,156 B2
(45) Date of Patent: Sep. 15, 2015

(54) DYNAMICALLY CONFIGURABLE MEMORY

(71) Applicant: Broadcom Corporation, Irvine, CA (US)

(72) Inventor: David Matthew Lewsey, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 260 days.

(21) Appl. No.: 13/681,991

(22) Filed: Nov. 20, 2012

(65) Prior Publication Data

US 2014/0122824 A1    May 1, 2014

Related U.S. Application Data

(60) Provisional application No. 61/719,583, filed on Oct. 29, 2012.

(51) Int. Cl.
| | | |
|---|---|---|
| G06F 12/00 | (2006.01) | |
| G06F 12/02 | (2006.01) | |
| G06F 11/14 | (2006.01) | |
| G06F 13/00 | (2006.01) | |
| G06F 3/06 | (2006.01) | |
| G06F 12/06 | (2006.01) | |
| G06F 1/26 | (2006.01) | |
| G06F 1/32 | (2006.01) | |

(52) U.S. Cl.
CPC .............. *G06F 12/02* (2013.01); *G06F 3/0625* (2013.01); *G06F 11/1441* (2013.01); *G06F 12/00* (2013.01); *G06F 12/0223* (2013.01); *G06F 12/0238* (2013.01); *G06F 12/06* (2013.01); *G06F 13/00* (2013.01); *G06F 1/266* (2013.01); *G06F 1/3203* (2013.01); *G06F 1/3243* (2013.01); *G06F 2201/86* (2013.01); *G06F 2212/7202* (2013.01)

(58) Field of Classification Search
None
See application file for complete search history.

(56) References Cited

U.S. PATENT DOCUMENTS

| | | | |
|---|---|---|---|
| 2011/0010503 A1* | 1/2011 | Yamamura et al. | 711/128 |
| 2013/0254497 A1* | 9/2013 | Chen et al. | 711/154 |

* cited by examiner

*Primary Examiner* — Midys Rojas
(74) *Attorney, Agent, or Firm* — Brinks Gilson & Lione (57) ABSTRACT

A device includes a memory including ways and a processor in communication with the memory. The processor is configured to execute logic. The logic can monitor a parameter of the processor or a device connected with the processor. The logic can allocate, based on the parameter, a number a ways and a size of ways of the memory for use by the processor. The logic can power down an unallocated number of ways and unused portions of the ways of the memory.

20 Claims, 10 Drawing Sheets

Example 1

Example 2

Example 3

DYNAMICALLY CONFIGURABLE MEMORY

PRIORITY CLAIM

This application claims priority to U.S. Provisional Application Ser. No. 61/719,583, filed Oct. 29, 2012, which is incorporated herein by reference in its entirety.

TECHNICAL FIELD

This disclosure generally relates to systems and methods, generally referred to as systems, for dynamically configuring memory.

BACKGROUND

A processor may utilize cache memory to store copies of data that are frequently requested from main memory. Cache memory may be smaller and faster than a main memory and may reduce an average time required for a processor to access the data stored in the main memory.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Systems and methods, generally referred to as systems, dynamically configure memory to actively save power. For example, to save power the number of ways in use can be reduced or the available memory can be changed, or both. In one example, the overall size of each way of a cache can be reduced so that unused data memories can be turned off and leakage power saved. In another example, the number of ways in a cache can be reduced to as many as required to cope with aliasing. This can save active power because, for example, only two ways rather than eight ways are checked on every memory access. This can also save leakage power as unused tag memories, and any unnecessary data memory can be turned off. Moreover, by reducing the overall size of each way and the number of ways, and mapping the required data for the ways onto the cache memory in a particular manner, the available cache memory can be utilized with no wastage in holes, which in turn increases the opportunities to turn off unused memory and save leakage.

Figure 1:
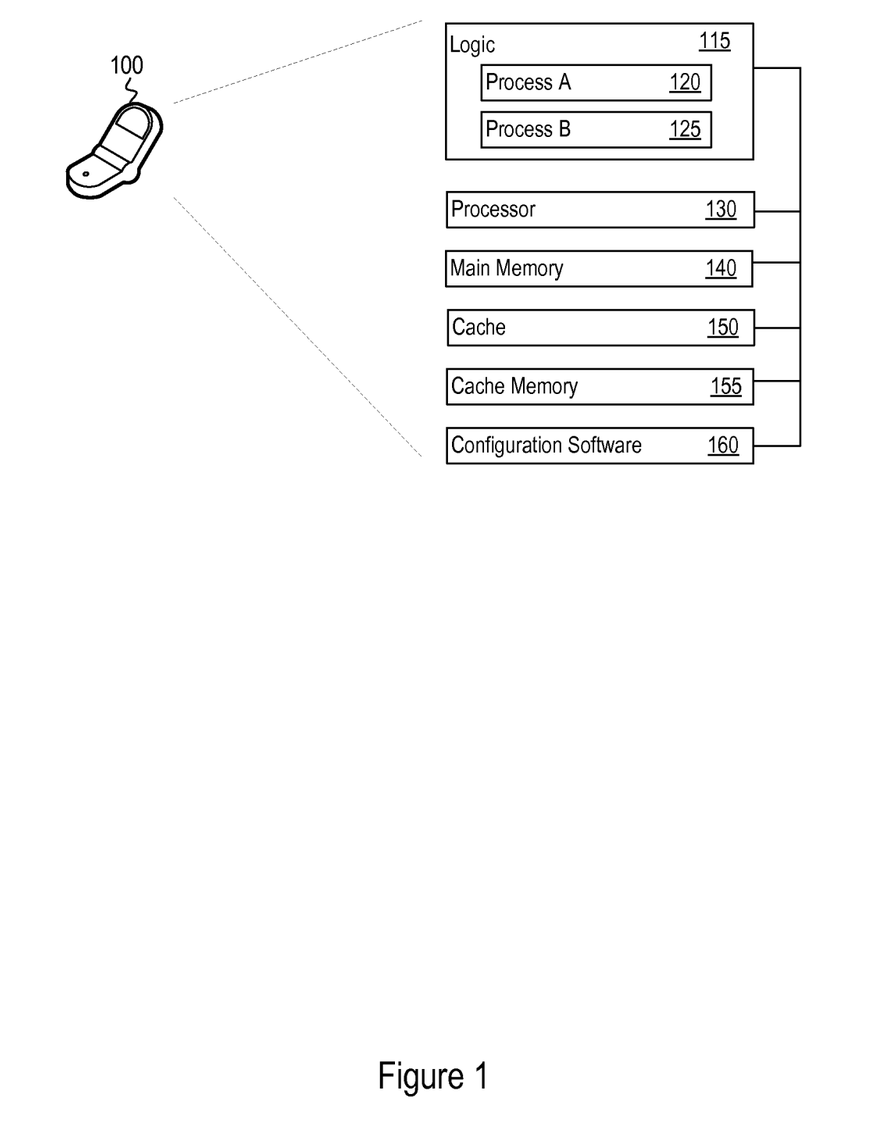
FIG. 1 is an example of a device that may dynamically configure memory.

FIG. 1 is an example of a device 100 that may dynamically configure memory, e.g., in terms of varying a size or a number of ways, or both. The device 100 may be virtually any type of electronic device that uses memory. As examples, the device 100 may be a computer, tablet, smart phone, personal digital assistant ("FDA"), set-top-box ("STB"), television, a smart card, or another electronic device or combination of devices. The device 100 may include logic to dynamically configure memory of the device 100, such as by allocating required memory while powering off memory that is not required. This may allow the memory of the device 100 to configure its memory to adjust to the current workload of the device 100. The device 100 may include logic 115, a process A 120, a process B 125, a processor 130, a main memory 140, a cache 150, and configuration software 160. Other configurations of logic may be included within the device 100.

The processor 130 may include a central processing unit ("CPU"), a graphics processing unit ("CPU"), or both. The processor 130 may be configured to run or execute the logic 115 to perform one or more applications, processes, or other processing functions, such as process A 120 and process B 125.

Process A 120 and process B 125 may be executed by the processor 130 to perform various tasks. As an example, the process A 120 and process B 125 may, when executed, play an audio file stored with the device 100, process 3-dimensional ("3-D") video data, load a web browser, make a phone call, decode and display a video, process camera images, play a game, run a text editing software, or perform virtually any other processing tasks or combinations of tasks. The process B 125 may be executed to perform the same or different tasks than process A 120.

The processor 130 may retrieve and store data, such as data used with the execution of the processes A 120 and processes B 125, in the main memory 140. The main memory 140 may be any type of memory, including dynamic random-access memory ("DRAM") or static random-access memory ("SRAM"), as examples. Access from the processor 130 is often passed through the cache 150. The cache 150 stores copies of data stored in the main memory 140 within the cache memory 155. The cache memory 155 is smaller and requires less time to access than the main memory 140. The cache 150 checks accesses from the processor 130 to determine whether a copy of the data exists in the cache memory 155. If it does, the cache 150 reads the data from, or writes the data to, the cache memory 155, which is faster than reading from or writing to the main memory 140. If the data is not already in the cache memory 155, then usually the cache 150 evicts some data from the cache memory 155, which may involve writing it back to the main memory 140 if it has been modified, and fetch the data now requested by the processor and store it in the cache memory 155.

The cache memory 155 is split into a number of cache lines. Cache lines contain a copy of the data from a number of consecutive locations of the main memory 140. For example, one cache line may contain a copy of the data in addresses 0, 1, 2, 3, 4, 5, 6, and 7 from the main memory, while another cache line may contain a copy of the data in addresses 64, 65, 66, 67, 68, 69, 70, and 71. An actual number of addresses from main memory stored per cache line varies from cache memory to cache memory, but they are consecutive, and the first entry in the line is an address that is a multiple of the number of addresses per line. In the above example, a cache line cannot contain addresses 3, 4, 5, 6, 7, 8, 9, 10. This grouping into cache lines improves efficiency of access to the main memory—fetching, e.g., 8 consecutive addresses as a single burst is more efficient than performing 8 distinct fetches, each accessing one address.

The cache lines may further be grouped into ways. A cache memory 155 may include a single-way, including all the cache lines, or may contain multiple ways, typically, but not necessarily, the same size as each other. The number of ways determines the associativity of the cache memory 155. For a given system memory address, there is one particular cache line in the way that may be used to store a copy of data at that system memory address. For a four-way cache memory 155, there are four cache lines that a particular address may be located, one in each way; for a single-way cache, there is one cache line in which a particular system memory address may be located. An index function is applied to the system memory address to determine which cache line in a way may contain that system memory address. e.g. the index function generates a number between 0 and the number of lines in the way. Typically, the same function is used for each way, but this is not necessary. Although in a four-way cache memory 155 there are four possible cache lines that a given system memory address may be located in, the operation of the cache ensures that there is no more than one copy of the same system memory in the cache at any one time.

Although there is only one cache line in each way that a particular system memory address may be stored within the cache, many different system addresses may be stored at this cache line since the main memory 140 is bigger than the cache memory 155. Therefore, for the cache lines, the cache memory 155 also stores a tag. The tag is a function of the system memory address and together with the index uniquely identifies the contents of the cache line. The tag may be the full system memory address, but as the index function already limits the possible system memory addresses that can be found in a particular cache line, a smaller tag is sufficient.

Along with the tag, the cache memory 155 also stores a cache line 'state' that indicates whether, for example, the cache line is valid, e.g. the cache has an up-to-date copy of the main memory 140, dirty, e.g., the cache line has been modified within the cache memory, so requires to be copied back to the main memory 140 at some time, or some other value depending on the design requirements of the cache 150.

When the processor requests a system memory address from the cache, to determine whether or not the corresponding data is present in the cache memory 155 then the cache 150 can operate as follows. For ways in the cache, the index function and tag function for that way is used to generate the index and tag for the requested system memory address within that way. As noted above, typically the same function is used for all ways, therefore only one index and one tag requires to be generated from the requested address. The cache 150 looks-up the tag and state of the indexed cache line within each way, and compare it to the tag generated from the requested address. If the tags match, and the state indicates that the contents of the cache line are not invalid, then the requested memory address is within that cache line of that way, and the operation requested by the processor is carried out by reading or writing that cache line, rather than accessing the main memory 140.

Although for each cache line of data, the cache memory 155 also stores a tag and a state value, they are rarely stored in the same memory as the access requirements and patterns for the three items are different. For example, the tag lookup is very fast, but there is normally more time available to access the data—so a smaller, faster memory is used to store the tags while the data can be stored in a slower, but more power efficient, memory. Similarly, if access to the cache memory 155 is pipelined then the process accesses the tags for one access at the same time as accessing the data for the previous access which again requires the tags and the data to be in distinct memories. Moreover, in a multi-way cache memory 155, although it is advantageous to be able to obtain the tags for each way in parallel, there is normally no need to be able to access data from multiple ways simultaneously so the data from all of the ways can be stored in the same memory.

Figure 2:
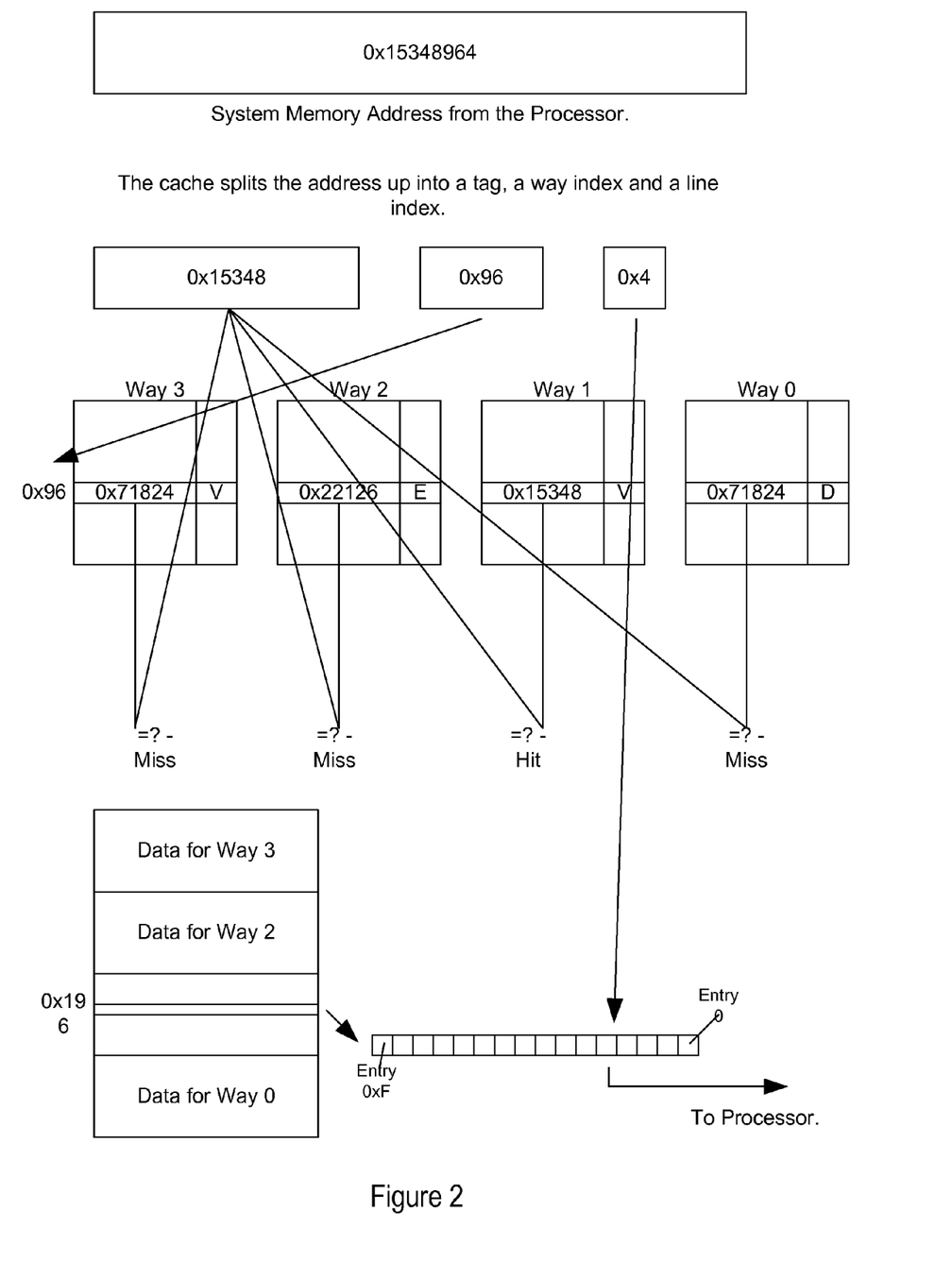
FIG. 2 is a block diagram of exemplary address mapping in cache memory.
Figure 3:
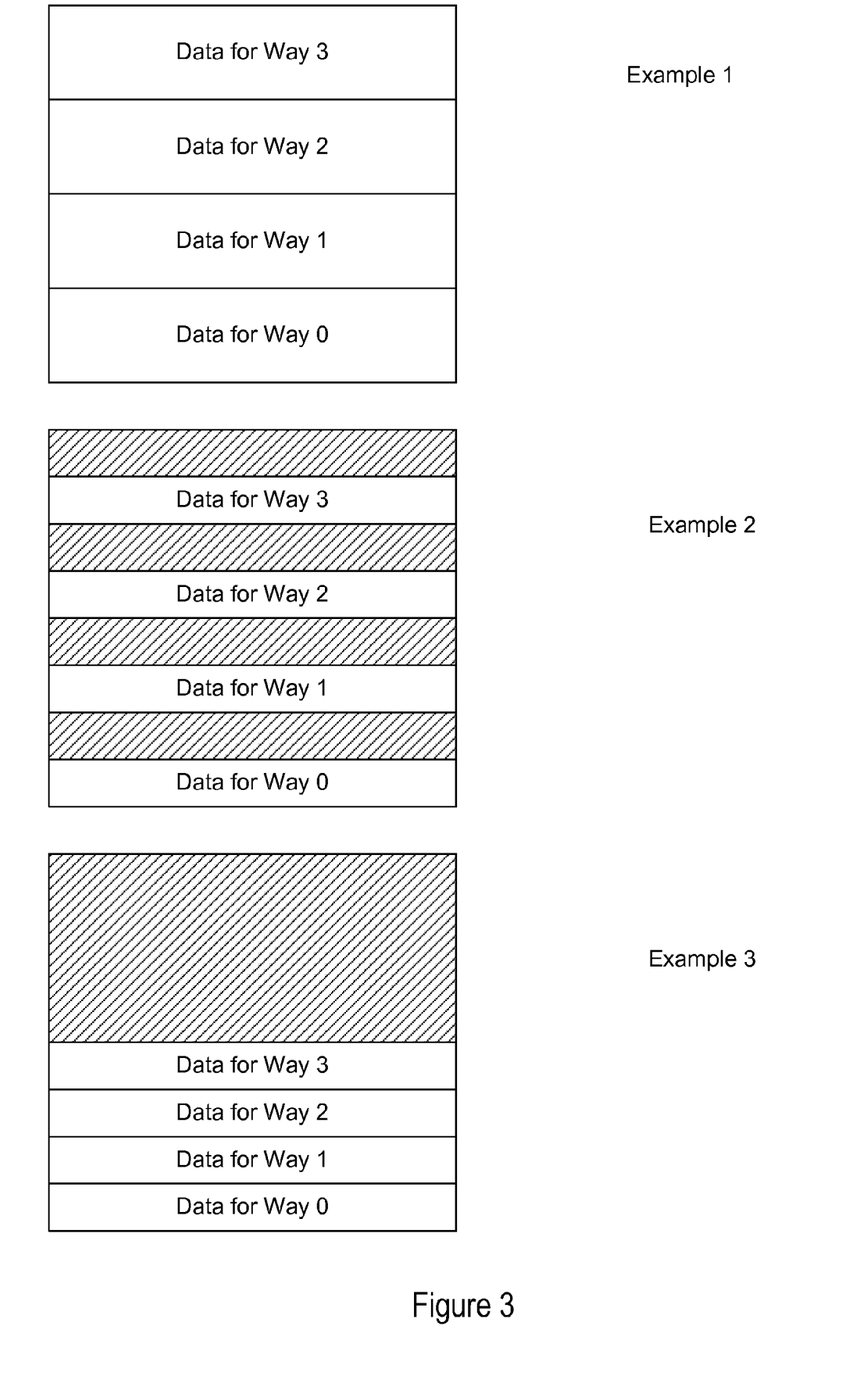
FIG. 3 is a block diagram of exemplary ways to map the ways in cache memory.

FIG. 2 is a block diagram of exemplary address mapping in cache memory. By concatenating the way number and the index, the location of the given cache line in the data memory is derived. This is later referred to as the cache memory address. The way index is used to look-up the tag and state for the indexed cache line in way 3, way 2, way 1 and way 0. In FIG. 3, three states are encoded: V is Valid, the data is present in the cache but unmodified, D is Dirty, the data is present in the cache, and has been changed, e.g., the dirty data is written back to the main memory before being replaced, E is Empty, even if the address matches, the data is not present in the cache. The tag stored in way 1 matches the tag of the requested address, and the state is valid, the data requested is in the cache. The data for the indexed line, 0x96, in way 1 is fetched, and the line index used to select the word of data within that line that the processor requested. Entry 4 of the indexed cache line is returned to the processor.

As one example, a processor generates an address that can be represented as eight hexadecimal digits in which the hexadecimal digit can take one of 16 values, 0-9, and A-F. If it is assumed that the each cache line in the cache memory 155 contains 16 words of data, then the bottom digit of the address determines which of the 16 words within a cache line the processor requires. If the ways of the cache memory 155 contains 256 lines, two hexadecimal digits have 256 possibilities, so the process can use the next two digits of the system memory address as the index into the way. The process then uses the remaining five digits of the system memory address as the tag. To determine whether a system memory address is in the cache memory 155, the process ignores the lowest digit and uses the next two digits to determine which tag to read from each way. The process compares the remaining five digits with those tags. If there is a tag match, and a favorable state, then the data accessed is located in the indexed cache line of the way with the matching tag. The lowest digit of the address can be used to determine which of the entries in the line includes the requested entry. For a majority of caches speed of access can be an important factor, and the simplicity of the above scheme allows it to be very fast.

The process can also address associativity, aliasing and thrashing. Two system memory addresses are aliases of each other if they have the same index. Continuing the example above, addresses 0x12345670, 0x20014670, and 0x51283670 are all aliases of each other as they have an index of 0x67. As detailed above, in any cache way there is one location a given system memory address can be found, that is the one identified by the index. If the processor 130 is executing both processes 120 and 125, and process 120 is frequently accessing address 0x12345670, and process 125 is frequently accessing address 0x20014670 then if the process only includes a single-way cache thrashing is likely to ensue.

When process A 120 accesses address 0x12345670, this is fetched from the main memory 140 and placed in cache line 0x67. But if process B 125 now accesses 0x20014670, the place this is allowed in the cache 150 is also line 0x67. The cache 150 copies line 0x67 back to 0x12345670 in main memory 140, if process 120 had changed it, so the only the cache memory 155 has the most up-to-date values, then reads in 0x20014670. Process 120 A again requests 0x12345670, so the cache 150 copies line 0x67 back to 0x20014670 in main memory 140 and fetch in 0x12345670. This continual swapping of data, or thrashing, can be avoided by increasing the number of ways, or associativity, of the cache memory 155. In a two-way cache 150, there are two cache lines that can take an address with index 0x67; line 0x67 of way 0 can store 0x12345670, line 0x67 of way 1 can store address 0x20014670 and process A 120 and process B 125 can now both execute with accelerated performance from the cache 150.

In that example, the size of the cache memory is doubled to obtain the second way, as the index function did not change. The process may also keep the overall size of the cache memory the same and have two ways of 128 lines each by using a different index function.

Thus, it can be seen that the more independent processes requesting data through the cache memory 155, whether from multiple processes executing on the same processor, or from multiple processors making requests from the same cache memory 155, the greater the associativity that may be required of the cache memory 155 to avoid thrashing. Greater associativity can come at a cost, however. For a sixteen-way cache memory 155, sixteen tag-lookups and compares are required to check whether a requested address is contained within the cache memory 155. The multiple look-ups can consume more power than the single tag-lookup and compare required for a single-way cache 150.

The process can also accommodate working set and capacity misses. In the description, the working set of a process includes the collection of data that the process accesses over a timescale comparable to memory access times. Although overall a process may reference, e.g., 1 Mbyte of data, if the process spends a period of time accessing a particular 8 kbyte section, then progressively moves on in 8 kbyte sections then this process receives only a small (or possibly no) performance improvement from using a 16 kbyte, 32 kbyte, or even a 1 Mbyte cache memory 155 over an 8 kbyte cache memory 155. If instead, the process spends a long time accessing a 16 kbyte section and the process is using an 8 kbyte cache 150, the process can suffer from capacity misses. Accesses to the second half of the 16 kbyte section can displace addresses from the first half in the cache 150, and vice versa. This can cause thrashing in a similar fashion to aliasing, but increasing the associativity of the cache may not help; even if any address can be placed in any cache line, a fully-associative cache memory 155, 16 kbyte of data cannot fit into an 8 kbyte cache memory. These, then, are capacity misses and can be solved by increasing the overall size of the cache memory.

Unlike when increasing associativity, increasing the size of the cache memory 155 may not significantly affect the active power consumption, e.g., reading 1 cache line out of an 8 kbyte memory is not significantly harder than reading 1 cache line out of a 16 kbyte or 32 kbyte memory. Larger memories do, however, leak power more than smaller memories. If the system includes a 1 MByte cache memory, running processes with a working set of 8 kbyte then the increased leakage power can become significant.

Smartphones and similar devices are being increasingly pushed to include greater and greater levels of processing power to provide greater and greater levels of functionality. Quad-core processing units alongside dedicated graphics and video engines are becoming ubiquitous. To stop such devices suffering thrashing, and poor performance due to aliasing or capacity misses, cache memory sizes and associativity are increasing. In traditional cache memory 155 designs, however, this can lead to an increase in power consumption. When the device 100 is inactive, or operating at a low performance level, for example, just displaying a clock on the screen, rather than running an advanced 3D game and downloading, decoding and displaying a video-stream in the background, then increased power consumption can be unnecessary and lead to reduced battery life for the device.

By dynamically reconfiguring the size of the cache, the associativity of cache, or both, the system can ensure that high-performance use-cases work efficiently, without paying the penalty of increased power consumption for this when only a low-performance level is required. An embodiment of these processes applies them to two caches within the system as a whole; the first is a single-way cache, and the second a larger, multi-way cache. For the first for purposes of explanation, a maximum cache memory size of 32 kbyte is assumed, and the chip in which this system is first embodied contains 32 kbyte of cache data memory. To allow for low-performance, low-power modes, however, the system can be configured to use 16 k, 8 k, or 4 k of the cache.

For an implementation of a 32 kbyte cache memory 155 with a 32-bit system address and a 256-bit wide cache data memory the five lowest bits of the address are taken for the line index, the next ten bits, e.g. bits 14 down to 5, are used as the cache index, and the remaining 17 bits form the tag. As the size of the cache memory 155 decreases, the index gets smaller, and the tag gets bigger. For a 4 k cache, only 7 bits are required for the cache index but the tag is 20 bits wide.

To implement the variable size of the cache, the index function is modified to apply a mask dependent on the current size of the cache. The process can start by extracting bits 14 down to 5 of the requested address. If the current size of the cache is 16 k, or, more generally, half the maximum allowed size, then the process forces the top bit of the index to be 0. If the current size of the cache is 8 k, quarter the maximum allowed size, then the two topmost bits of the index is forced to zero. Similarly, for 4 k, an eighth, the three topmost bits are forced to zero. The resulting index has the required property of being a number between 0 and the number of lines in the currently selected cache size.

For the tag function, the process uses the upper 20 bits of the system address for the tag. Although this can have some redundancy for caches sizes greater than the minimum allowed, by storing the widest possible tag the comparison stage is simplified, the process checks the upper 20 bits of the address against the 20-bit tag stored in the cache regardless of the current size of the cache. Making the comparison independent of the current size makes it faster and more power efficient than performing a 17-bit comparison when using 32 k, an 18-bit comparison if using 16 k, and so on. With the above index and tag functions in place, the operation of the cache is constrained to the selected size, and any unused upper sections of the cache and tag memories can be powered down to reduce leakage.

The same principles for reducing the size of the single-way cache are also applied to reducing the size of each way of the multi-way cache. Although here the maximum allowed size of each way is 64 kbyte, the process can again choose to run each way using only half, a quarter, or an eighth of the maximum capacity. Further to this, the cache design also permits the number of active ways to be selected. A maximum of 16-ways can be permitted, as limited by the amount of tag memory placed on the chip. This reflects the amount of aliasing expected when running the most demanding, highest performance use cases. When running at a lower performance level, the number of active ways can be reduced accordingly. If a way is inactive, then reads from that way's tag memory are suppressed, and the inputs to that way's comparator are forced to a static value. This in itself reduces the active power involved in checking whether a requested system address is present in the cache. If only four ways are selected, then only four tag memories are read from, and only four comparisons are made. Further savings can be made by also turning off the power to the unused tag memories, and thus preventing their leakage.

FIG. 3 is a block diagram of exemplary ways to map the ways in cache memory. Another aspect of the embodiments relates to dynamically changing how the way and index of a cache line are mapped onto the cache data memory. In example 1 of cache the data for each way are stored consecutively in one bigger memory. The data for way 0, followed by all the data for way 1, etc. When using this approach, the cache memory address, e.g. where to find the desired cache line within the cache data memory, is formed by appending the desired way index to the desired way. Continuing the mapping from the example, line 0x96 of way 1 is found at address 0x196 in the cache memory; line 0x23 of way 0 is found at address 0x023 in the cache memory.

If this scheme were used, then when running with reduced size ways holes in the cache data memory can appear, as illustrated in example 2, such that the ways are not stored contiguously. Supposing the 64 k ways of the multi-way cache, if the process operates these ways at half-capacity, e.g. 32 k, then the first 32 k of the cache data memory is used to store the data for way 0. The next 32 k are not used, but then the third 32 k section of the memory is used to store the data for way 1, and so on. Unless the process includes sufficiently fine grained control of the memory to be able to power down each 32 k section, even though half of the memory is unused, the process does not power down any of it. Powering down arbitrary 32 k, or 16 k, or 8 k sections requires a more complicated memory instance than one in which, e.g., only 256 k sections can be powered up or down.

In example 3, the process uses the current size of the ways to determine how many bits of the cache way index to combine with the desired way in order to form the cache memory address. A 16-way, 64 k/way cache includes 11-bits from the cache way index, and 4-bits to denote the desired way and combine these to form a 15-bit cache memory address. If the process is running with half-size cache ways, e.g., 32 k, not 64 k, then the process only need take the lower ten bits from the cache way index, the top bit is zero anyway. Combining the ten bits with the four-bits used to denote the way, and adding a zero bit at the top to pad out to the required 15-bits, has the effect of combining the data for all the ways continuously together with no holes. Even if the cache memory 155 only allows powering down at a granularity of half the size of the cache memory 155, the process can power down the unused half of the cache memory and reduce the leakage power of the chip.

One benefit of this scheme is that the total available cache data memory can be shared over the number of active ways as required. In a cache able to support a use-case that requires a 64 k way size to avoid capacity misses, and a use case that requires a 16-way cache, to avoid aliasing, require a cache data memory of size 16*64 k=1 MByte to be able to meet both constraints. If the use case that requires 16 ways to avoid aliasing requires no more than a 32 k way size, and the use case that requires a 64 k way size does not require more than 8 ways to avoid aliasing, then the process can support both these use cases with only a 512 kbyte cache data memory, if the cache is configured to operate in a mode that only requires the lower half of the nominal full-size cache data memory, max. size of way*max. number of ways, then it does not matter if the top-half of the cache data memory is not actually there. This may yield a saving in the area, and therefore cost, of a device.

The processor 130 may utilize the configuration software 160 to dynamically configure memory, such as the cache memory 155, of the device 100, e.g., in terms of varying a size or a number of ways, or both. The configuration software 160 may, for example, determine and allocate part or all of the cache memory 155 for use with processes, such as process A 120 and process B 125, being executed by the processor 130. The configuration software 160 may additionally or alternatively turn off, part or all of the cache memory 155 not allocated for the processes being executed by the processor 130. By turning off cache memory 155 that may not be required, the configuration software 160 may do one or more of save power, improve speed of cache memory, improve computer performance, and decrease the average memory access time. While the configuration software 160 may be described with respect to the cache memory 155, the configuration software 160 may be used to dynamically configure various other memories as well, for example.

Figure 4:
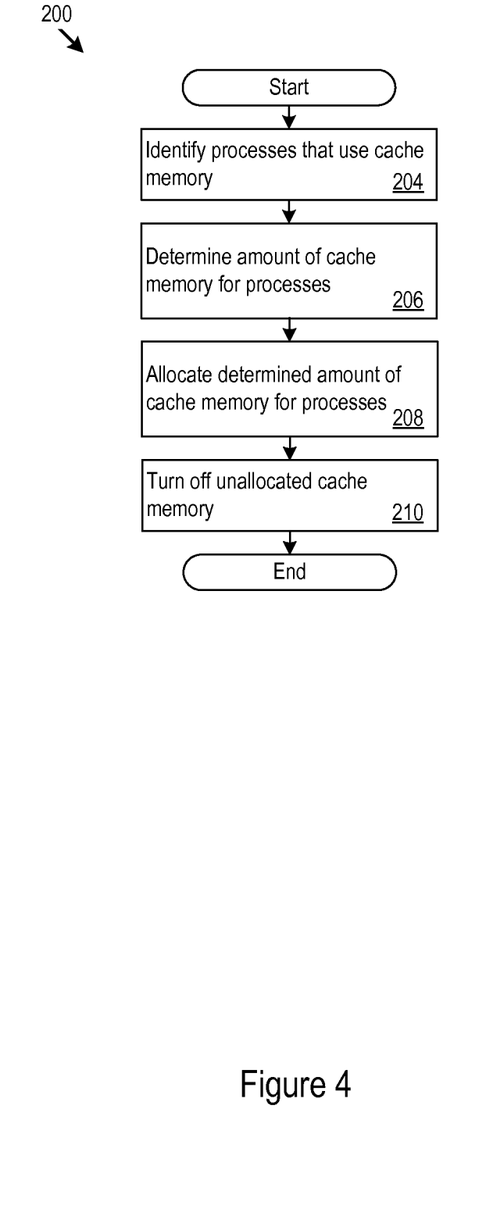
FIG. 4 is an example of logic for dynamically configuring memory.

FIG. 4 is an example flow diagram of logic 200 for dynamically configuring memory, e.g., varying a size or a number of ways, or both. A device 100 may implement the logic 200 in hardware, software, or both, to dynamically configure memory, such as cache memory 155, of the device 100. The configuration software 160 may include the logic 200. The device 100 may execute the configuration software 160 with the logic 200 to determine an amount of the cache memory 155 to allocate for use with processes being executed by the processor 130.

The configuration software 160 may first be executed to identify processes that may use cache memory (204). The device 100 may identify processes being executed by the processor 130. The device 100 may additionally or alternatively identify processes upon initialization or start-up of the process. For example, the device 100 may execute the configuration software 160 which may determine the process A 120 and process B 125 being initialized or executed by the processor 130.

The device 100 may determine an amount of cache memory 155 that it may allocate for use by the identified processes (206). As an example, the configuration software 160 may determine an amount of the cache memory 155 to allocate to the processes A 120 and processes B 125 being initialized or executed by the processor 130 based on one or more device parameters, processor parameters, or factors ("factors"), such as a number of processes being executed by the processor 130 and the minimum cache memory requirements of process A 120 and process B 125 being executed. Other exemplary factors may include the type of processes that process A 120 and process B 125 are executing. Other processes may include performance or efficiency with which process A 120 and process B 125 may be executed, cost or cost savings, and workload required for the execution of process A 120 and process B 125, or various other factors. The amount of cache memory 155 to allocate may be based on the memory requires or memory requirements of the processor 130 executing the process A 120 and process B 125.

As an example, process A 120 and process B 125 being executed by the processor 130 may require a minimum amount of cache memory 155 to operate. The configuration software 160 may determine a minimum amount of cache memory 155 required for process A 120 and process B 125 being executed by the processor 130 to determine an amount of the cache memory 155 to be allocated for use with the execution of process A 120 and process B 125. To allocate the memory, the configuration software can, for example, vary a size of way or a number of ways, or both.

For example, for eight processes requiring 8 k of memory each, then an 8-way*8 kbyte=64 kbyte cache can be provided. If two processes that require 32 kbyte each, then a 2-way*32 k=64 k cache can be provided. The same amount of data memory may be utilized, but six of the tag memories can be turned off in the second case.

In determining an amount of cache memory, the device 100 may determine a portion of the cache memory 155, number of cache memory ways, a number of physical cache memory blocks, or a combination of these to allocate for use by the processor 130 with the processes A 120 and processes B 125.

The device 100 may allocate the determined amount of cache memory 155 for use by the identified processes (208). As an example, the configuration software 160 may allocate, for use by the processor 130 in initiating or executing the processes A 120 and processes B 125, the determined portion of the cache memory 155, the determined number of cache memory ways, the determined number of physical cache memory blocks, or the determined combination.

The device 100 may turn off, part or all of the remaining cache memory 155 that was not allocated (210). The device 100 may turn off, some or all of the unallocated cache memory 155, the unallocated cache memory ways, the unallocated physical cache memory blocks, or unallocated combination. In other implementations, the logic may perform (204), (206), (208), and (210), in a different order or at different times.

The device 100 may turn off memory by varying the number of ways, varying the size of the ways, or both varying the number of ways and varying the size of the ways. For example, for a fully-loaded system an, e.g., 8*16 k way cache is required. For a minimum use case, e.g., maintaining a clock on the screen, only, e.g., 16 k is required. By changing a size of the ways an 8*2 k way cache can be powered on and the top ⅞th of the data memory turned off. In this scenario there may be 8 tag memory reads and 8 compares on every access consuming active power. By changing an associativity of the cache, e.g., a number of ways, this can provide for example a 2*8 k way which requires only 2 tag memory reads and compares for every access. Turning on 2*8 k and turning off the upper half portion of the ways and turning off 6*16 k ways may be determined to save more power than the leakage saved by turning off the upper ⅞th of the 8*16 k way data memory. Therefore, the device 100 may allocate memory according to the latter scenario.

The configuration software 160 may allocate the cache memory 155 (208) for different types of cache memory 155. Where the cache memory 155 includes a single-way cache memory block, the configuration software 160 may control the index bits of the cache memory address to dynamically control the amount of cache memory 155 used by the processor 130.

The cache memory address for the single-way cache memory block may include a designated number of T bits (index bits), 't' bits (tag bits), and 'x' bits. Cache lines in the single-way cache memory block may be uniquely identifiable by, and directly mapped with, the index value designated by the T bits of the cache memory address.

The configuration software 160 may set the number of T bits for the cache memory addresses to be equal to the number of T bits required if the entire single-way cache memory block was allocated for use by the processor 130. For example, the configuration software 160 may set 10 'i' bits for some or all cache memory address of a 32 kb, 256-bit wide single-way cache memory block.

The configuration software 160 may then mask off, or force to zero, a first number of the index bits of the cache memory addresses to limit the amount of the cache memory 155 for use by the processor 130 (210). For example, where the configuration software 160 determines that only half or less of the single-way cache memory block is required, the configuration software 160 may mask off, or force to zero, the first 'i' bit of the cache memory addresses. Therefore, the configuration software 160 may limit the use of the cache memory 155 to the bottom half of the single-way cache memory block, as any cache line associated with a first 'i' bit of '1' may be excluded or not accessed. Where the configuration software 160 determines that only a quarter or less of the single-way cache memory block is required, the configuration software 160 may mask off, or force to zero, the first two 'i' bits of the cache memory address, limiting the use of the cache memory 155 to the bottom quarter of the single-way cache memory block. For additional halving of the cache memory 155, the configuration software 160 may mask off an additional top 'i' bit, limiting the allocated single-way cache memory block to the bottom portion of the cache memory 155.

The configuration software 160 can store a number of 't' tag bits for cache lines. Because the number of 'x' bits remains constant, as the size of the cache memory 155 gets smaller, and the number of 'i' bits decreases, the number of 't' tag bits may increase. The configuration software 160 may store as the tag for cache lines a number of bits equal to the size of the tag when the cache has been reduced to its smallest determined size. For example, a 32 kb single-way cache memory 155 may require 10 'i' bits, leaving 17 't' bits, and 5 'x' bits, while a 4 kb single-way cache memory 155 may require 7 'i' bits, leaving 20 't' bits, and 5 'x' bits. In this example, if the 4 kb configuration represents the smallest size the cache memory 155 may be reduced to, the configuration software 160 may store a 20-bit tag for cache lines of the single-way cache memory block. Therefore, the configuration software 160 may configure the single-way cache memory 155 simply and without changing a designated number of number of 'i' and 't' bits in the cache memory address or cache line.

The configuration software 160 may monitor the allocated cache memory 155 continuously, periodically, at intervals, at random, or at various other times. The configuration software 160 may adjust the amount of allocated cache memory 155 by powering on or off additional amounts of cache memory 155, e.g., in terms of varying a size or a number of ways, or both, in response to a change in the factors used for determining the allocation, the settings of the device 100, or the requires of a user of the device 100. The configuration software 160 can reduce the size or number of ways, or both, to save power.

By dynamically configuring the memory of the device, such as by allocating only a required portion of cache memory 155 and by turning off unallocated cache memory 155, or by reducing the number of ways, the device 100 may reduce power consumption and simplify cache memory accesses. This may improve efficiency and processing speeds achievable for the device 100. Additionally, the device 100 may be include a larger cache memory 155 for operations that may require a lot of cache memory, while not being burdened with powering the cache memory 155 when only a small portion of it is required. In other implementations, the logic may perform (204), (206), (208), and (210), in a different order or at different times.

Figure 5:
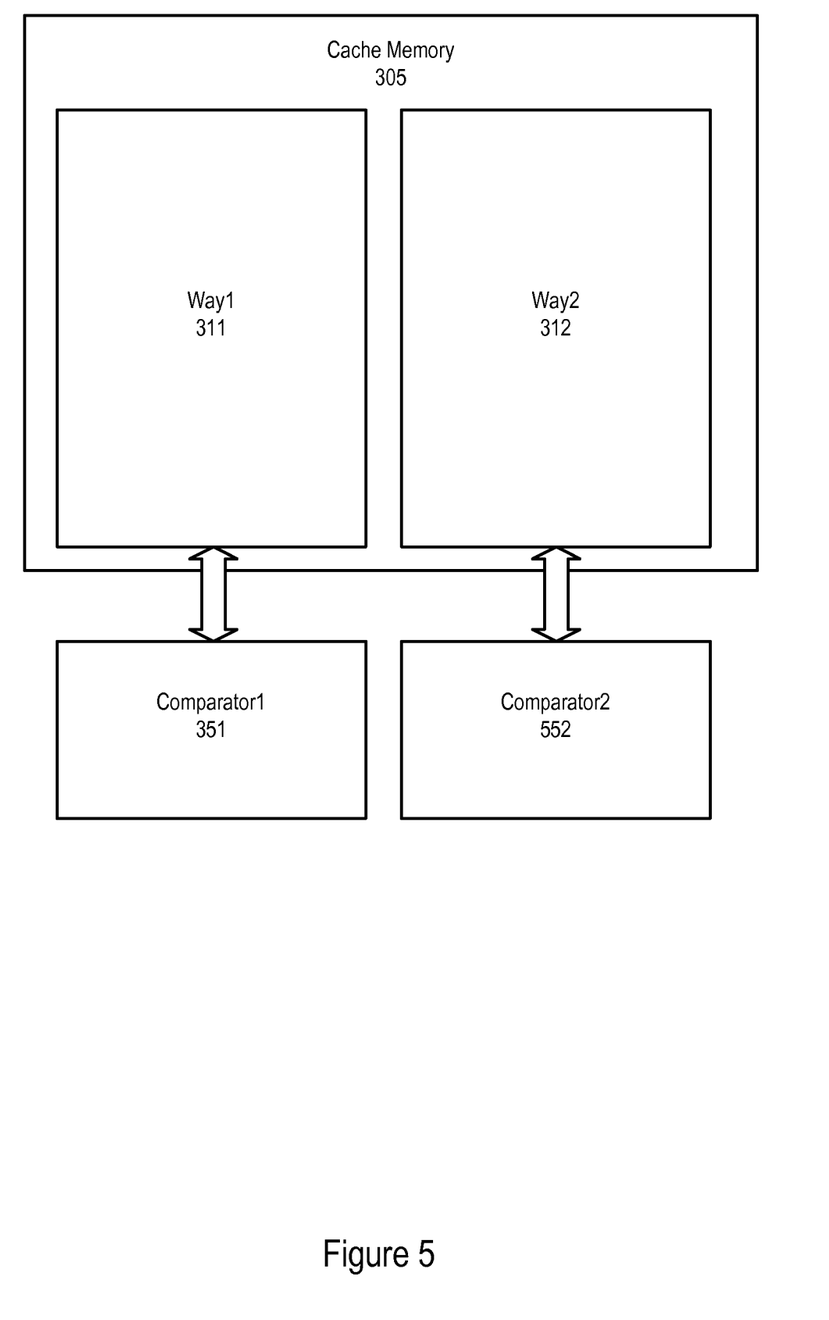
FIG. 5 is an example diagram of a cache memory.
Figure 6:
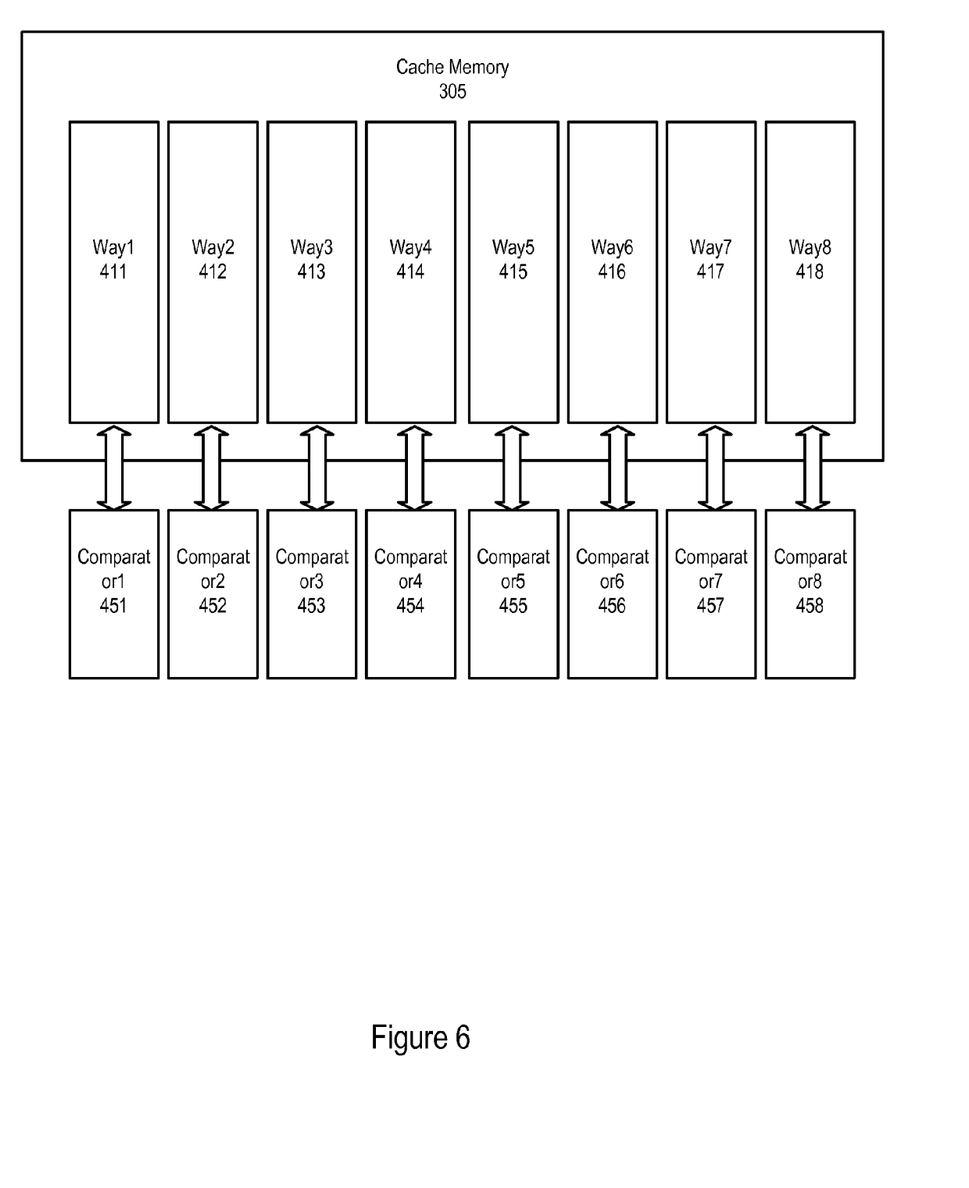
FIG. 6 is an example diagram of a cache memory.

FIGS. 5 and 6 are examples of multi-way cache memory 305. The cache memory 155 may be or include multi-way cache memory blocks. The multi-way cache memory 305 may be modifiable to operate with various numbers of cache memory ways at different times, depending on a requirement of the processor 130. For example, based on the requirements of the processor 130, the multi-way cache memory 305 may be configured with two cache memory ways, including way1 311, and way2 312. In response to different requires or configurations, the multi-way cache memory 305 may be configured with eight cache memory ways, such as way1 411, way2 412, way3 413, way4 414, way5 415, way6 416, way7 417, and way8 418. The multi-way cache memory 305 may be various sizes and configured to operate with various numbers of ways.

Cache memory ways of the multi-way cache memory 305 may operate as a single-way cache, with the multiple ways running in parallel with each other. For example, the multi-way cache memory 305 may be a 32 kb cache memory block operating in two ways 311-312, each of which may appear as a separate 16 kb single-way cache memory block operating in parallel with each other. As another example, the multi-way cache memory 305 may be a 32 kb cache memory block operating in eight ways 411-418, each of which may appear as a separate 4 kb single-way cache memory block operating in parallel with each other.

The device 100 can include comparators for the possible cache memory ways of the multi-way cache memory 305. For example, if the multi-way cache memory 305 is configured to operate with two cache memory ways, the device 100 includes two comparators 351-352, one for each of the possible cache memory ways 311-312. If the multi-way cache memory 305 is configured to operate with eight cache memory ways 411-418, the device 100 includes eight comparators 451-458, one for each of the possible cache memory ways 411-418. If less than a number of comparators are required for a process, then tag memory can be powered down and inputs of the comparator do not consume active power.

The configuration software 160 may determine an amount of the cache memory 305 required for processes A 120 and processes B 125 being executed by the processor 130. The determination may be similar to, the same as, or different from the determination for single-way cache memory blocks.

The configuration software 160 may identify and allocate, based on the determination of the amount of cache memory 305 required, some or all of the cache memory ways 311-312 (or 411-418) for processes A 120 and processes B 125. Where the configuration software determines that some or all of the cache memory ways 311-312 (or 411-418) are not required, the configuration software 160 may turn off, the unrequired and unallocated cache memory ways 311-312 (or 411-418) and the comparators 351-352 (or 451-458) that may be associated with the unallocated cache memory ways. The configuration software 160 can vary a powered size of the ways or a number of powered ways, or both. Unallocated ways and portions of the size of the ways can be powered down.

As an example, the cache memory 305 may be a 32 kb cache memory block configured with way1 311 and way2 312 each operating as 16 kb cache memory blocks. The configuration software 160 may determine that the processor 130 is about to execute the process B 125, and that the process B 125 may require 16 kb of cache memory for proper operation. The configuration software 160 may allocate or designate way1 311 and way2 312, or way1 311 or way2 312, for use by the processor 130 in executing the process B 125. The configuration software 160 can also determine an amount of the memory of way1 and way2 to power.

As another example, the cache memory 305 may be a 32 kb cache memory block configured with ways 411-418 each operating as 4 kb cache memory blocks. The configuration software 160 may determine that the processor 130 is executing process A 120, which requires 16 kb of cache memory, and process B 125, which requires 8 kb of cache memory.

The configuration software 160 may allocate or designate ways 411-416 (or any six ways) for use by the processor 130 in executing the processes A 120 and B 125, which may account for 24 kb of cache memory. The configuration software 160 may additionally disable, turn off, ways 417-418 (or any two ways) which may not require to be allocated. Other variations and examples are possible.

The configuration software 160 may monitor the allocated cache memory 305 continuously, periodically, at intervals, at random, or at various other times. The configuration software 160 may adjust the amount of allocated cache memory 20 by powering on or off additional ways of cache memory 155 in response to a change in the factors used for determining the allocation, the settings of the device 100, or the requirements of a user of the device 100.

Figure 7:
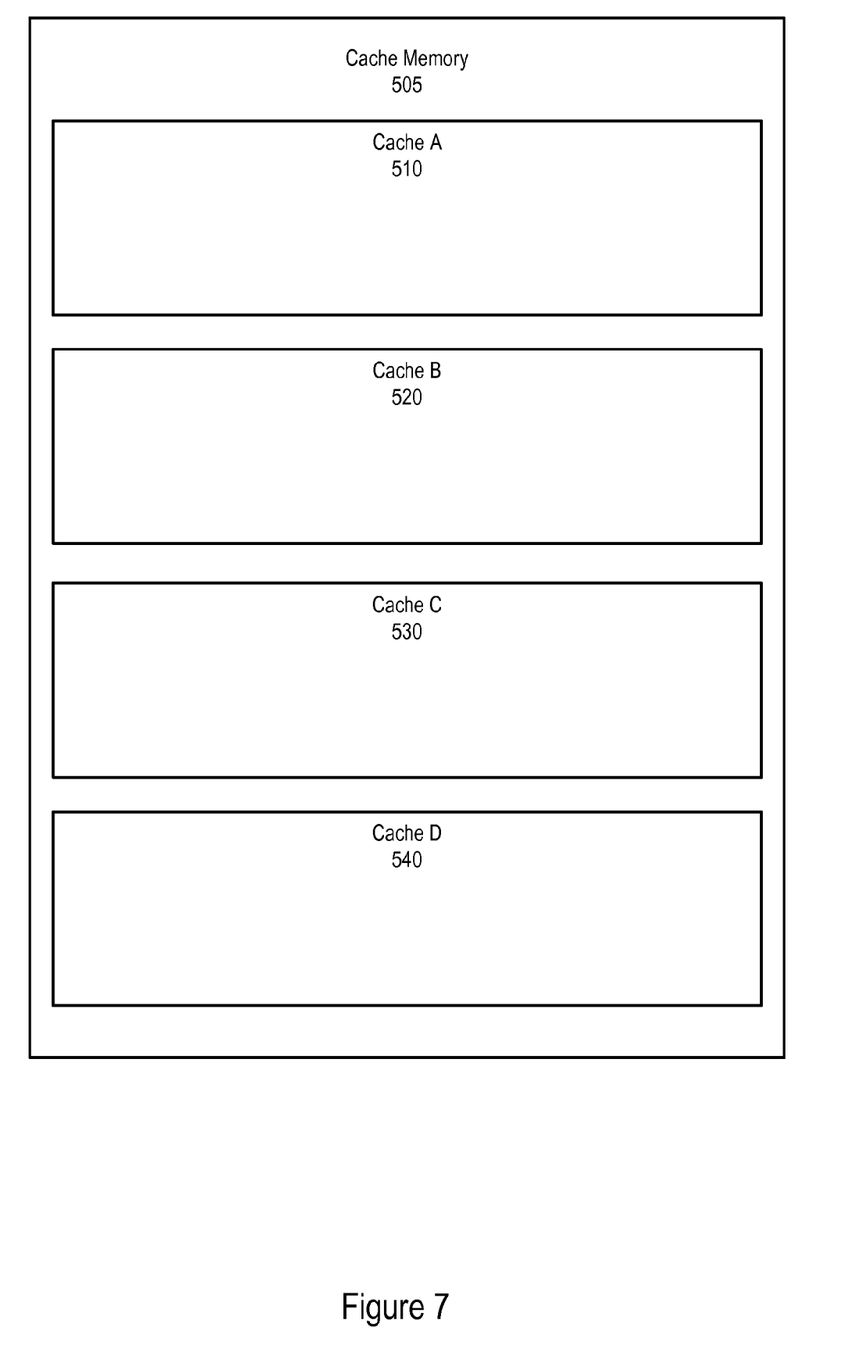
FIG. 7 is an example diagram of a cache memory.

FIG. 7 shows an example of a cache memory 505 with four cache memory blocks: cache A 510, cache B 520, cache C 530, and cache D 540. The cache memory 155 may include the cache memory 505 or one or more physical cache memory blocks. The cache memory blocks cache A 510, cache B 520, cache C 530, and cache D 540 may be, for example, RAM cache memory blocks or various other cache memory blocks. The cache memory 505 may include any number of cache memory blocks combined together. The cache memory 155 may be, or may include, the multiple block cache memory 505.

The processor 130 may utilize the configuration software 160 to dynamically configure the cache memory 505, such as by allocating and controlling the cache A 510, cache B 520, cache C 530, and cache D 540. The configuration software 160 may determine an amount of cache memory 505 to allocate, as described.

After identifying an amount of cache memory 505, the configuration software 160 may determine and allocate cache memory blocks cache A 510, cache B 520, cache C 530, and cache D 540 that may satisfy the determined amount. The configuration software 160 may additionally or alternatively turn off, those cache memory blocks cache A 510, cache B 520, cache C 530, and cache D 540 that the configuration software 160 did not allocate or which are not required.

As an example, the cache A 510, cache B 520, cache C 530, and cache D 540 may each be 32 kb single-way cache memory blocks. The configuration software 160 may determine that the processor 130 is about to execute the process B 125, and that the process B 125 may require 64 kb of cache memory for proper operation. The configuration software 160 may allocate or designate cache A 510 and cache B 520 (or any two of the four cache memory blocks) for use by the processor 130 in executing the process B 125. The configuration software 160 may additionally turn off, the cache C 530 and the cache D 540, or the remaining two cache memory blocks.

Figure 8:
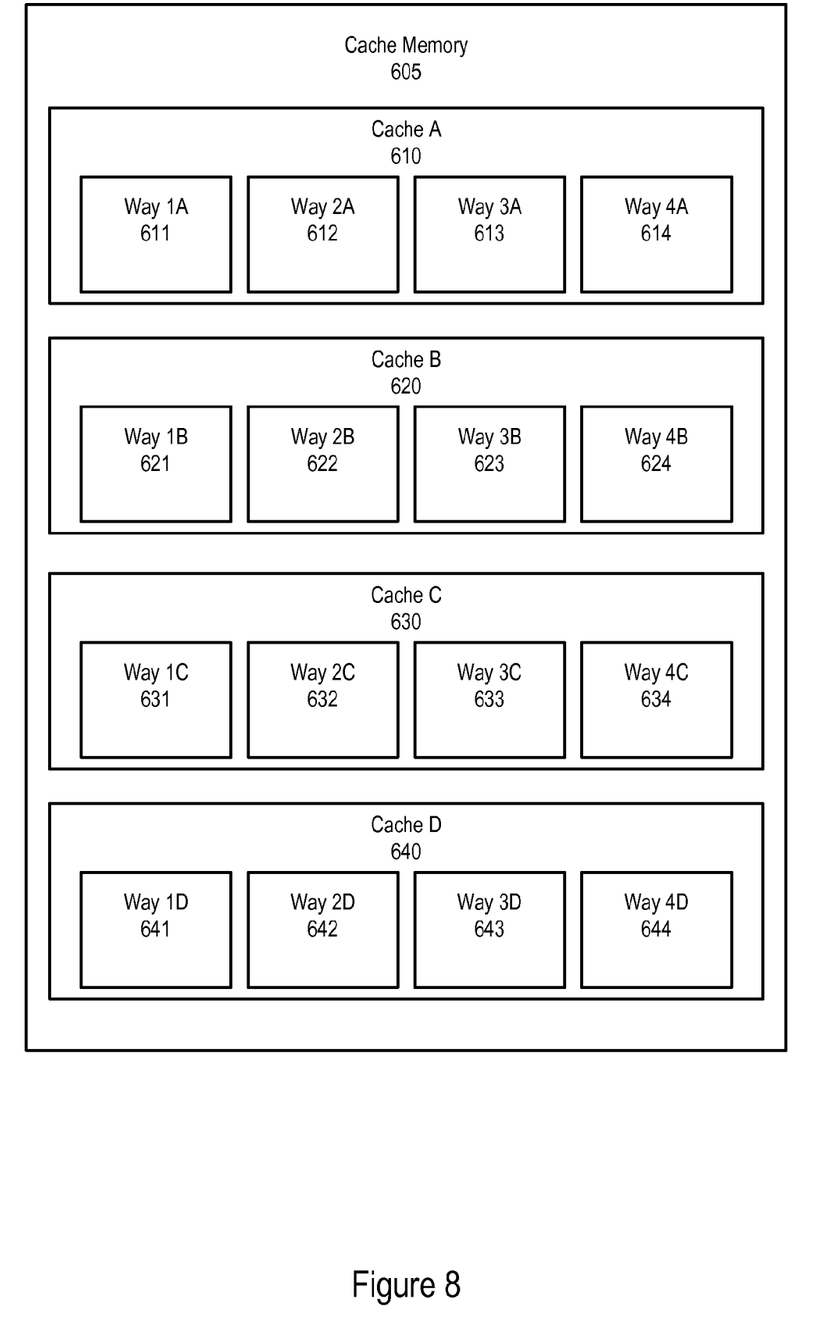
FIG. 8 is an example diagram of a cache memory.

FIG. 8 shows an example of a cache memory 605 with four multi-way cache memory blocks: cache A 610, cache B 620, cache C 630, and cache D 640. The cache memory 155 may include a combination of multi-way cache memory blocks. The cache memory blocks cache A 610, cache B 620, cache C 630, and cache D 640 may resemble the multi-way cache memory 305, and may be operated in multiple ways. The cache A 610, cache B 620, cache C 630, and cache D 640 may be different from each other and may be operated with a different number of ways.

The processor 130 may utilize the configuration software 160 to allocate and control the cache memory 605 by allocating and controlling the cache A 610, cache B 620, cache C 630, and cache D 640 and allocating and controlling the ways 611-614, 621-624, 631-634, and 641-644 of the cache memory blocks cache A 610, cache B 620, cache C 630, and cache D 640.

The configuration software 160 may determine an amount of cache memory 155 to allocate according to a number of factors and in various manners. After identifying an amount of cache memory 605, the configuration software 160 may allocate some or all of the cache memory blocks cache A 610, cache B 620, cache C 630, and cache D 640 for use by the processor 130 in executing the processes A 120 and B 125. The configuration software 160 may additionally or alternatively allocation some or all of the ways 611-614, 621-624, 631-634, and 641-644 of the cache memory blocks cache A 610, cache B 620, cache C 630, and cache D 640 for use by the processor 130 in executing the processes A 120 and B 125. The configuration software 160 may additionally or alternatively turn off, those cache memory blocks cache A 610, cache B 620, cache C 630, and cache D 640 and ways 611-614, 621-624, 631-634, and 641-644 of the cache memory blocks cache A 610, cache B 620, cache C 630, and cache D 640 that the configuration software 160 did not allocate or which are not required. Various other examples are possible.

Figure 9:
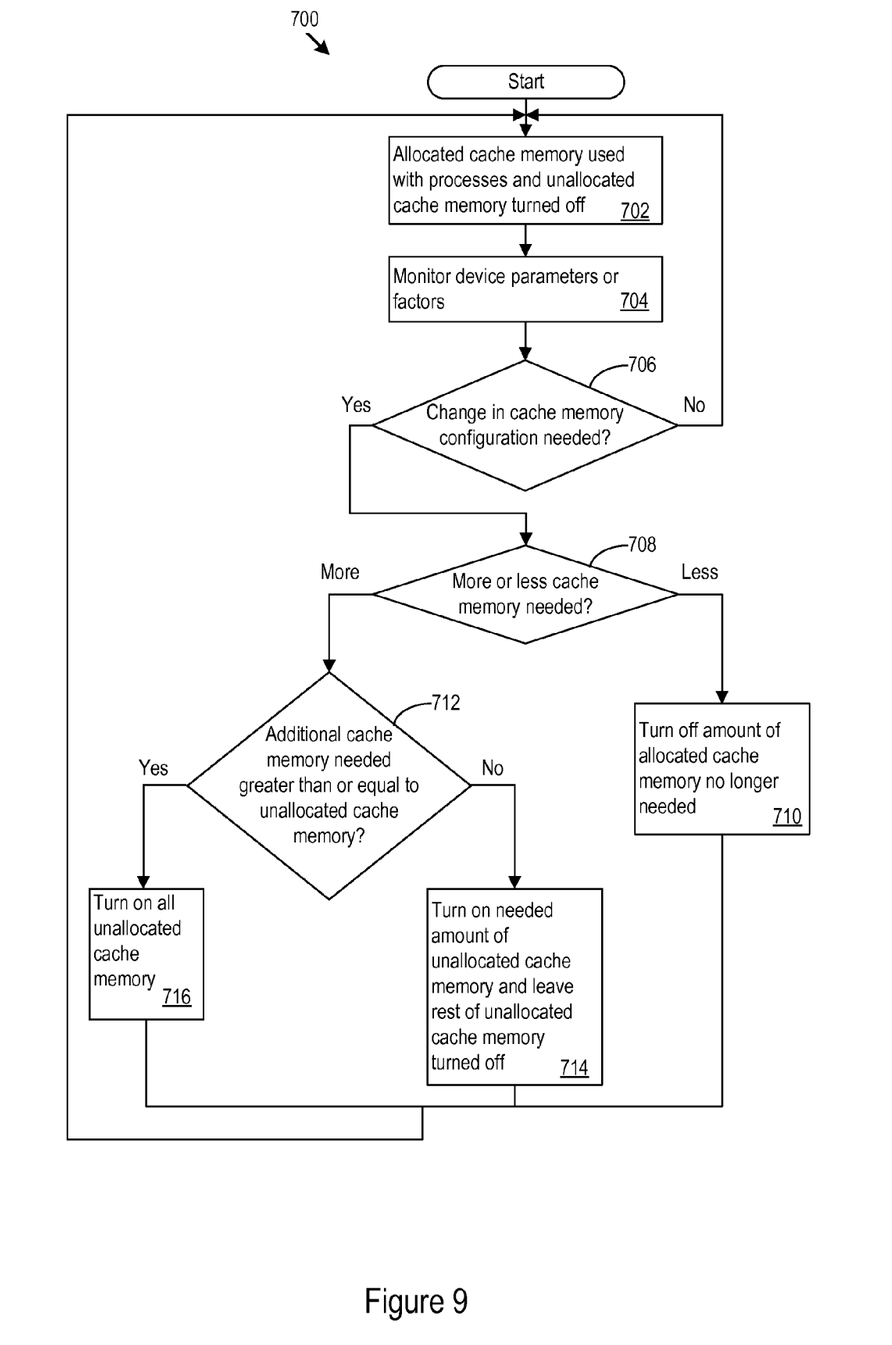
FIG. 9 is an example of logic for dynamically configuring cache memory.

FIG. 9 is an example flow diagram of logic 700 for dynamically configuring memory, e.g., in terms of varying a size or a number of ways, or both. A device 100 may implement the logic 700 in hardware, software, firmware, or a combination of them, to dynamically configure memory, such as the cache memory 155, of the device 100.

The device 100 may be operating using allocated cache memory 155 for the execution of processes by the processor 130 (702). Additionally or alternatively, part or all of the unallocated cache memory 155 may be turned off or powered down (702). As an example, the device 100 may be operating based on the configuration of the cache memory 155 performed by the logic in FIG. 2. The allocation and use of the cache memory 155 may remain constant, and the device 100 may use the same amount of cache memory 155, until one or more factors or device parameters change.

The device 100 may monitor one or more device parameters or factors (704). The device may, for example, monitor a number of processes A 120 and processes B 125 being initiated, executed, or terminated by the processor 130, a minimum cache memory requirement of the processes A 120 and processes B 125, the type of processes A 120 and processes B 125 being executed, performance or efficiency which the processes A 120 and processes B125 may be executed, cost or cost savings, workload required for the execution of processes A 120 and processes B 125, or various other factors. The device 100 may monitor the device parameters or factors continuously, periodically, at intervals, when triggered, at random, or at various other times.

The device 100 may determine, based on the monitored device parameters or factors, whether a change in the cache memory configuration is required (706). The device 100 may be programmed with settings that may identify when a change in the cache memory configuration is required. The settings may be set by a manufacturer or user. The settings may depend on one or more monitored factors. The settings may be modified or changed according to manufacturer or user specifications.

The device 100 may determine that a change in the cache memory configuration is required whenever a monitored factor changes. The device 100 may alternatively determine that a change in the cache memory configuration is required when changes in the monitored factors are greater than threshold values. As an example, the device may monitor a number of functions and factors, and may identify when the settings of a device 100 transition from one state or threshold to another. If a number of executed processes is greater than a designated level, the device 100 may identify that a change in the cache memory configuration of the device 100 is required.

The device 100 may determine that a change in the cache memory configuration is required when changes in the monitored factors change a state of operation of the device 100. As an example, the device 100 may identify a termination or initialization of a process 120 or 125 as an event that may require a change in the cache memory configuration. The device 100 may determine that some cache memory 155 may be powered off to conserve the power of the temporary power source, or vice versa. Various other examples are possible.

When the device 100 determines that no change in the cache memory configuration is required, the device may continue to use the allocated cache memory 155 for execution of process A 120 and process B 125 while the turned off, unallocated cache memory 155 remains powered down (704). The device 100 may continue to monitor the device parameters and factors to determine when a change in the cache memory configuration is required (706).

When the device 100 determines that a change in the cache memory configuration is required, the device 100 may determine whether more or less cache memory 155 is required (708). The device 100 may determine that less cache memory 155 may be required in various instances, such as where processes 120 or 125 are terminated, less complex or intricate processes A 120 and processes B 125 are being executed.

Where the device 100 determined that less cache memory is required, the device 100 may identify an amount of allocated cache memory 155 that is no longer required, and turn off that amount of the allocated cache memory 155 (710). To power down the allocated cache memory 155, the device can e.g., vary a powered size of the ways or a number of ways being powered, or both. The determination of the amount of allocated cache memory 155 that is no longer required may be performed by subtracting the required amount of cache memory 155 from the amount of allocated cache memory 155. The device 100 may turn off the determined amount previously allocated cache memory 155 by turning off or powering down any combination of a portion of the cache memory 155, one or more cache memory blocks, such as cache A 610, cache B 620, cache C 630, or cache D 640, and one or more cache memory ways such as ways 611-614, 621-624, 631-634, or 641-644. The device 100 may then return to (704), where the device 100 may use remaining allocated cache memory 155 with process A 120 and process B 125 while the unallocated cache memory may remain turned off or powered down.

Returning to (708), the device 100 may instead determine that more cache memory 155 is required. The device 100 may determine that more cache memory 155 may be required in various instances, such as where additional processes A 120 and processes B 125 are initiated, more complex or intricate processes A 120 and processes B 125 are executed.

Where the device 100 determined that more cache memory is required, the device 100 may identify an amount of unallocated cache memory 155 that is required. The determination of the amount of unallocated cache memory 155 that is required may be performed by subtracting the amount of allocated cache memory 155 from the required amount of cache memory 155.

The device may compare the cache memory 155 required with the unallocated cache memory 155 (712). When the cache memory 155 required is less than the unallocated cache memory 155, the device 100 may turn on a portion of the unallocated cache memory 155 corresponding to the amount of cache memory 155 required (714). The device 100 may turn on or power up the determined amount previously unallocated cache memory 155 by turning on or powering up any combination of a portion of the cache memory 155, one or more cache memory blocks, such as cache A 610, cache B 620, cache C 630, or cache D 640, and one or more cache memory ways such as ways 611-614, 621-624, 631-634, or 641-644. The turned on cache memory 155 may subsequently become allocated cache memory 155, and the device 100 may use the turned on cache memory 155 with the previously allocated cache memory 155 for the process A 120 and process B 125. The remainder of the unallocated and turned off cache memory 155 may remain turned off. The device 100 may then return to (704), where the device 100 may use allocated cache memory 155 with process A 120 and process B 125 while the unallocated cache memory may remain turned off or powered down.

Returning to (712), when the additional cache memory 155 required is greater than or equal to the unallocated cache memory 155, the device 100 may turn on all of the unallocated cache memory 155 (716). The turned on cache memory 155 may subsequently become allocated cache memory 155, and the device 100 may use the turned on cache memory 155 with the previously allocated cache memory 155 for process A 120 and process B 125. The device 100 may then return to (704), and use the turned on cache memory 155. In other implementations, the logic may perform (704), (706), (708), (710), (712), and (714) in a different order or at different times.

Figure 10:
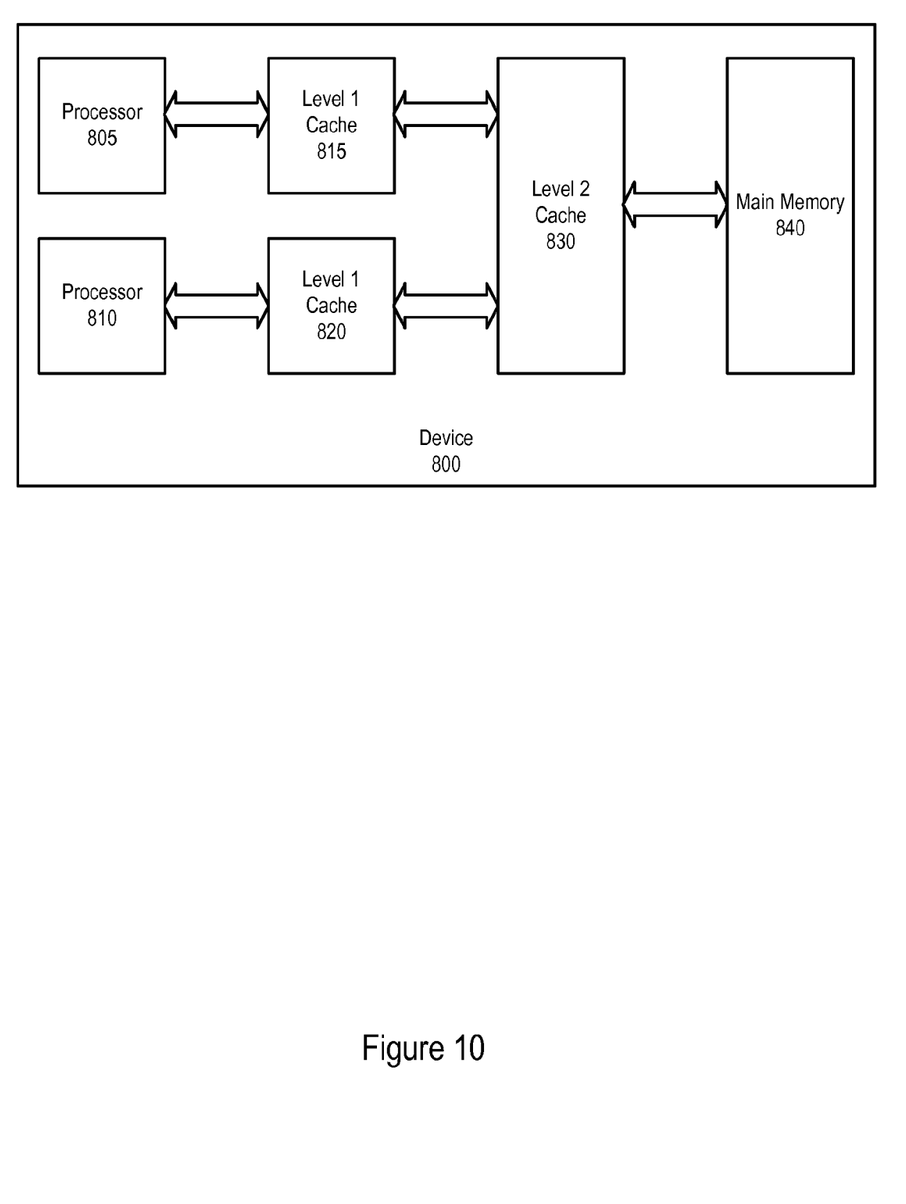
FIG. 10 is an example of a device that may dynamically configure memory.

FIG. 10 is one example of a device 800 that may include dynamically configurable memory, e.g., in terms of varying a size or a number of ways, or both. The device 800 may include, or be configured to execute, the logic of the methods described herein, such as the methods of FIGS. 2 and 7. The device 800 may be similar to, the same as, or different from the device 100, and may include the same, similar, or different components.

The device 800 may include processors 805 and 810. The device 800 may include fewer or more processors 805 and 810. The processors 805 and 810 may be processing cores, which may be part of, or may be combined to form, a larger processor or processing network. The processors 805 and 810 may include a central processing unit ("CPU"), a graphics processing unit ("CPU"), or both. The processors 805 and 810 may be or be a part of processing cores or clusters of general-purpose processors. The processors 805 and 810 may be configured to run or execute one or more functions, software, code, logic, applications, or other processes, such as the process A 120, the process B 125, and the configuration software 160. The processors 805 and 810 may be similar to, the same as, or different from each other and the processor 130.

The device 800 may include a main memory 840. The main memory 840 may be any type of memory, including dynamic random-access memory ("DRAM") or static random-access memory ("SRAM"), as examples. The main memory 840 may be similar to, the same as, or different from the main memory 140.

The device 800 may include level 1 caches 815 and 820. The level 1 caches 815 and 820 may be smaller, faster memories than the main memory 840. The level 1 caches 815 and 820 may store copies of data stored in the main memory 840 or the level 2 cache 830. The level 1 caches 815 and 820 may, for example, be single-way cache memory blocks. The processors 805 and 810 may have a level 1 cache 815 or 820 which may be local to the processors 805 and 810.

The device 800 may include a level 2 cache 830. The level 2 cache 830 may be a smaller, faster memory than the main memory 840. The level 2 cache 830 may store copies of data stored in the main memory 840. The level 2 cache 830 may, for example, be a multi-way cache memory block. The level 2 cache 830 may operate with a cache memory way for the processors 805 and 810 or level 1 caches 815 and 820. The level 2 cache 830 may be a system-level or device-level cache used or controlled by both of the processors 805 and 810, and/or both of the level 1 caches 815 and 820. In some systems, one level 2 cache 830 may be used for all processors 805 and 810 of the device 800. In other systems, a level 2 cache 830 may be used for a subset of the processors 805 and 810 of the device 800. The device 800 may include more than one level 2 cache 830.

The processor 805 may retrieve and store data in the level 1 cache 815 and the level 2 cache 830. The processor 810 may retrieve and store data in the level 1 cache 820 and the level 2 cache 830. When the processor 805 requires to read data from or write data to, the main memory 840, the processor 805 may first check the level 1 cache 815 to check whether a copy of the data exists in the level 1 cache 815. If it does, the processor 805 may read the data from, or write the data to, the level 1 cache 815, which may be faster than reading from or writing to the main memory 840. If it does not, the processor 805 may check the level 2 cache 830 to check whether a copy of the data exists in the level 2 cache 830. If it does, the processor 805 may read the data from, or write the data to, the level 2 cache 830, which may also be faster than reading from or writing to the main memory 840. The processor 810 may perform similar checks of the level 1 cache 820, and then check the level 2 cache 830 for data prior to accessing the main memory 840.

The device 800 may include, or access and use, configuration software 160. The configuration software 160 may be operable to control an allocation of level 1 caches 815 and 820 for use by the processors 805 and 810. The configuration software 160 may manipulate index bits of the cache memory addresses to control an amount of the single-way cache memory blocks that is available for use by the processors 805 and 810. The configuration software 160 may turn off unallocated portions of the level 1 caches 815 and 820.

The configuration software 160 may additionally or alternatively be operable to control an allocation of the level 2 cache 830 for use by the processors 805 and 810 and level 1 caches 815 and 820. The configuration software 160 may manipulate the index bits of the cache memory addresses, as well as reduce the cache memory ways of the multi-way cache memory block, to control an amount of the single-way cache memory blocks that is available for use by the processors 805 and 810. The configuration software 160 may turn off unallocated portions or unallocated cache memory ways of the level 2 cache 830. The configuration software 160 may be operable to dynamically configure the memory of a device 800 with multiple levels of cache memory 155, as well as with single-way and multi-way cache memory blocks.

While various embodiments of the systems and methods have been described, it is apparent to those of ordinary skill in the art that many more embodiments and implementations are possible within the scope of the systems and methods. Accordingly, the systems and methods are not to be restricted except in light of the attached claims and their equivalents.

What is claimed is:

1. A device, comprising:
  a memory including ways;
  a processor in communication with the memory, the processor configured to execute logic operable to:

monitor a parameter of the processor or a device connected with the processor;

allocate, based on the parameter, a number of ways and a size of ways of the memory for use by the processor; and power down an unallocated number of ways and unused portions of the ways of the memory.

2. The device of claim 1, where the memory comprises a multi-way cache memory.

3. The device of claim 1, where the logic is further operable to map the ways onto the memory according to the size and the number of ways to avoid holes in the memory.

4. The device of claim 1, where the memory comprises a plurality of volatile memory blocks.

5. The device of claim 4, where a portion of the memory comprises one of the volatile memory blocks.

6. The device of claim 1, where the parameter comprises a number of processes being executed by the processor, a memory requirement of the processes being executed by the processor, the type of the processes being executed by the processor, a performance of the processes being executed by the processor.

7. The device of claim 1, where the logic is operable to manipulate an index bit of a cache memory address corresponding to a portion of the memory to power down the portion of the memory.

8. A method, comprising:

within a device:

utilizing, with a processor, a first amount of a memory allocated to the processor while a second amount of the memory that is not allocated is powered down;

monitoring a memory requirement for a processor;

identifying a change in the memory requirement; and modifying the first amount of the memory allocated to the processor or the second amount of the memory that is not allocated based on the change in the memory requirement.

9. The method of claim 8, where the modifying comprises powering off a portion of a size of ways of memory, a number of ways, or both the portion of the size of the way and the number of ways.

10. The method of claim 8, further comprising powering on and allocating a portion of a size of ways of memory, a number of ways, or both the portion of the size of the way and the number of ways when the memory requirement increases.

11. The method of claim 8, where the change in the memory requirement comprises an initialization of a process to be executed by the processor.

12. The method of claim 8, where the change in the memory requirement comprises a termination of a process being executed by the processor.

13. The method of claim 8, where modifying comprises mapping ways onto the memory according to a size and a number of ways to avoid holes in the memory.

14. The method of claim 13, where the processor comprises a plurality of processing cores and the memory requirement corresponds to a number of the processing cores that are powered on.

15. A device, comprising:

a main memory;

a cache memory in communication with the main memory;

a processor in communication with the main memory and the cache memory, the processor configured to execute a process; and logic executable by the processor and operable to:

determine how much of the cache memory is necessary to be used by the processor in executing the process; and turn off an unnecessary portion of a size of ways of the cache memory, a number of ways of the cache memory, or both the portion of the size of the way of the cache memory and the number of ways of the cache memory.

16. The device of claim 15, where the cache memory comprises a single-way cache memory block and a multi-way cache memory block.

17. The device of claim 16, where the logic is operable to manipulate an index bit of a cache memory address for the single-way cache memory block to turn off a second portion of the cache memory.

18. The device of claim 16, where the logic is operable to turn off a way of the multi-way cache memory block and to turn off a portion of the way.

19. The device of claim 16, where the single-way cache memory block is a local first level cache memory block and the multi-way cache memory block is a second level cache memory block.

20. The device of claim 15, where the ways are mapped onto the cache memory and the mapping is modified according to the size and the number of ways to avoid holes in the cache memory.

* * * * *